United States Patent Office 2,706,707
Patented Apr. 19, 1955

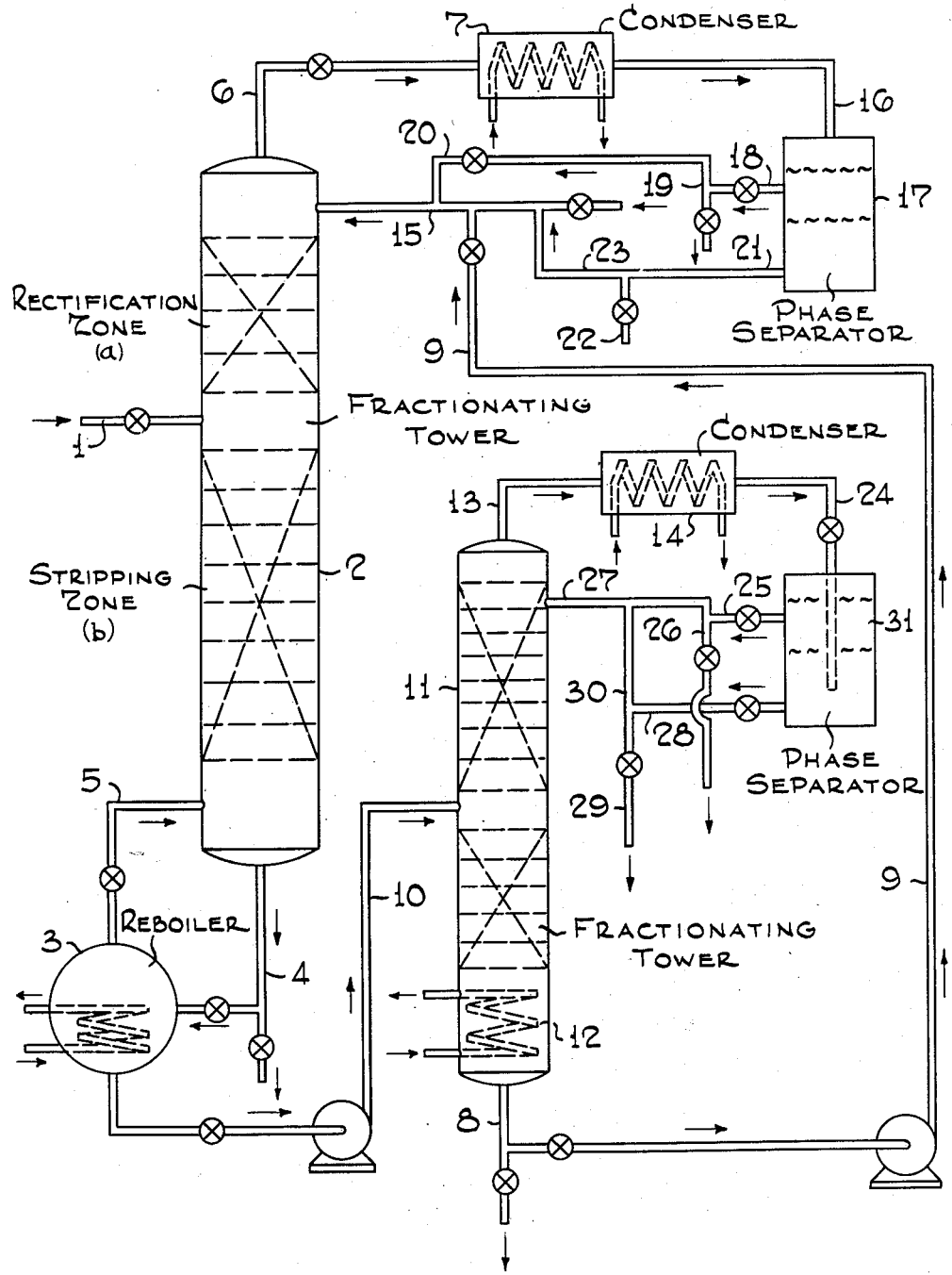

2,706,707

EXTRACTIVE DISTILLATION OF OXYGENATED ORGANIC COMPOUNDS

Charles E. Morrell, Westfield, Joseph Stewart, Cranford, and Carl S. Carlson, Roselle, N. J., assignors to Esso Research and Engineering Company, a corporation of Delaware Application May 5, 1950, Serial No. 160,118

10 Claims. (Cl. 202—39.5)

This application relates to a novel method for the separation of oxygenated organic compounds and, more specifically, it involves a method in which hydrotropic organic solubilizers are used in an extractive distillation procedure for the separation of specific close-boiling oxygenated organic components from mixtures, and particularly for the separation of cyclic alcohols from acyclic alcohols having approximately the same molecular weights and boiling points. This application is a continuation-in-part of Serial No. 68,836 filed January 3, 1949, now U. S. Patent 2,567,228.

This invention is for a novel extractive distillation method in which the separation of oxygenated organic components from mixtures of such components is accomplished by altering the relative volatility of the compounds by the addition of water containing hydrotropic organic solubilizers. These aqueous solutions of hydrotropic organic solubilizers are capable of so altering the volatilities of the components relative to each other that one desired component can be removed from the distillation zone as a vapor, while the other component remains behind.

It is well known that relatively closely-boiling oxygenated compounds and those having structures and molecular weights sufficiently similar cannot be separated either by conventional fractional distillation methods or by chemical techniques. In some cases, these closely-boiling oxygenated materials can be separated by the use of extractive distillation methods with certain selected solvents. The common water concentration range used in these extractive distillation processes varies from 50 to 99.9 mole percent, depending on the type of organic compounds and their molecular weights.

There are numerous sources from which mixtures of oxygenated organic compounds may be derived and from which it may be desirable to separate pure chemical compounds; for instance, mixtures which result from fermentation, controlled oxidation of hydrocarbons, Fischer-Tropsch synthesis, and Oxo synthesis. These may contain amounts of alcohols, aldehydes, ketones, esters, and ethers in varying proportions. Many of these compounds have boiling points which are so close that the difference in volatility is small. In addition, the compounds are very prone to form azeotropes with each other during distillation so that distillation results in the final production of azeotropic mixtures rather than in the separation of pure components.

In some cases, solutions of inorganic salts can be used as extractive media during distillation to modify the volatility of the oxygenated organic compounds. One of the difficulties encountered in such extractive distillation separation processes is the limitation placed on the capacity of fractionating equipment by the limited solubilities of higher molecular weight oxygenated compounds in such extractive solvents. It is necessary, for a most efficient distillation operation, that the solution within the distillation column on all plates consist of a single liquid phase. However, the addition of inorganic salts to an aqueous solution of a mixture of oxygenated organic compounds, tends to precipitate the compounds from the aqueous solution, thus forming two liquid phases rather than the desired one-phase liquid system. This precipitation phenomenon limits the application of extractive distillation with aqueous salt solutions to those cases where the solubility of the organic compounds in the extractive solvent is appreciable.

It has now been discovered that, by the use of certain very specific compounds, which may be called solubilizers or solubilizing assistants, these extractive distillation separations of closely-boiling oxygenated compounds can be accomplished to give a high degree of specificity in the separation of components and good purity of the products so separated. These solubilizers are of use in any type of extractive method which uses extracting solvents and where the principle of the method is that of vapor-liquid contact. Solutions of these solubilizers have been found particularly valuable in vapor-liquid contacting methods using the so-called extractive distillation techniques for the separation of closely-boiling oxygenated compounds. Under limited conditions of operation, certain types of non-aqueous solvents can be used in conjunction with the solubilizers and may offer a valuable separation technique for mixtures of oxygenated compounds. In general, the non-aqueous solvents which are useful are those having more than one active group, especially of the polar type, and demonstrating a somewhat similar solvent action to that shown by aqueous mixtures, although this is not absolutely necessary. These polyfunctional compounds frequently have more extensive solubility action for the oxygenated components being separated than do aqueous mixtures.

The useful solubilizers can be a wide variety of organic compounds which promote to a more or less degree specific increased solubilities of certain of the oxygenated compounds in the aqueous phase containing the solubilizer in preference to other oxygenated compounds which may be present in the starting mixture. Many types of these chemical agents which are frequently designated as hydrotropic agents are known and have been described in the literature, since their properties have made them useful in other fields. In the art, the term "hydrotropic agents" is used to describe highly polar compounds which, when added to a polar liquid such as water, are capable of increasing the solubility of solutes in that liquids. Those hydrotropic agents which are most useful for this invention are preferably salts of organic compounds. They must be capable of dissolving in water to give highly concentrated aqueous solutions in order to form a single phase of a liquid nature. In general, this requires the formation of a true solution, although a colloidally dispersed system is also possible. The optimum solubilizer concentration will vary with the molecular weight and type of materials being treated. For six carbon monohydric alcohols, a solubility of at least 40% by weight of a solubilizer is required although a $C_4$ monohydric alcohol can be completely solubilized by as little as 4 weight percent solubilizer. Broadly, concentrations of from 3 weight percent to 70 weight percent or more of such solubilizer of adequate solubility can be employed. In general, there is an optimum range of solubility of a solubilizing agent for any particular separation.

For aqueous solutions, the compounds have a basic carbon skeleton containing generally not more than twelve or fifteen carbon atoms, since compounds containing more than that number have a relatively low solubility in water which may render them almost wholly useless. Such high molecular weight hydrocarbon residues outweigh the solubilizing effect of the polar groups. The carbon skeleton may be of the class of aliphatic, alicyclic, or aromatic, and may be either carbocyclic or heterocyclic in nature. It has been found that better solubilizers for the most specific separations are those having cyclic nuclei which are of the aromatic series such as benzene and naphthalene. Those solubilizers derived from the mononuclear aromatics are especially valuable because of high solubility and ready availability.

These nuclei must have as substituents one or more polar radicals or solubilizing groups such as a sulfonic acid, a carboxylic acid, a quaternary amine salt, a sulfate, or a phosphonate. These may be used in the form of the free acid or base or, preferably, they may be used as the more soluble salts. Suitable salts include the alkali metal salts such as sodium, potassium, or lithium. Also useful are the ammonium or amine salts. In most cases, the water-soluble salts are especially desirable. It is even possible to use a hydrotropic compound having an acidic group and a hydrotropic agent having a basic group to form a salt therewith having dual action which has an enhanced effect over either of the compounds where used alone. In general, the water-soluble salts of the mononuclear aromatic sulfonic acids have been found particularly valuable as hydrotropic organic solubilizers.

Other groups may also be present on the solubilized nuclei and in most cases such groups are highly desirable and should be selected with special attention to the desired separation as they lend the solubilizer compound its specificity. Groups of this type which may be present include alkyl, halogen, hydroxy, nitro, alkoxy, and amino, both substituted and unsubstituted.

A large number of salts, and in some cases free acids, can be used as solubilizers. These include the sodium, potassium, lithium, ammonium, and amine salts of acids.

As specific examples of compounds which are useful, there may be named the water-soluble salts of benzene sulfonic acid, salicyclic acid, phthalic and terephthalic acids, toluene sulfonic acids, xylene sulfonic acids, naphthalene sulfonic acids, cymene sulfonic acid, dimethylaniline sulfonic acid, naphthol sulfonic acids, napthylamine sulfonic acid, nitrobenzene sulfonic acids, chlorobenzoic acids, thiophene carboxylic acids, nitrophthalic acid, camphoric acid, cyclohexane sulfonic acid, taurine, amino acids, lauryl sulfonic acid, furoic acid, and anthraquinone sulfonic acids. Substituted amine salts, for instance, pyridinium salts such as the chlorides and sulfates, which are water-soluble, are also to be considered within the scope of this invention.

The water-soluble salts, and particularly the readily available sodium salts, of the sulfonic acids have been found convenient since they give superior results as solubilizers and, in addition, are readily available by standard sulfonation techniques.

In many separations, it is desirable to use mixtures of solubilizers to obtain maximum efficiency in separations and it is considered within the scope of this invention to employ either single hydrotropic agents or mixtures of such agents.

While these solubilizers are ordinarily to be used in aqueous mixtures, other substances as auxiliary solubilizers may also be present and may actually be of especial value. In some instances, such additional agents may serve a very useful function, causing significant increases in the solubilities of the oxygenated organic compounds in the aqueous mixtures. Modifying agents of this type include various soluble inorganic salts such as the alkali metal salts. Potassium sulfate has been found to be of particular value as an auxiliary solubilizer. Other water-soluble salts can also be present in the extractive solvent mixture and, in general, they produce no undue deleterious effects on the operation. The salts so used should preferably be derived from relatively strong bases and strong acids so that hydrolysis will be minimal.

No special problem is encountered in the recovery of the separated components, since the compounds which are rendered less volatile by the presence of the hydrotropic agent can be removed from the water-solubilizer phase by conventional methods, as, for example, stripping of the volatile organic compounds from the aqueous phase. In the event that the oxygenated organic compound is substantially water-insoluble, one very excellent method for the separation is carried out simply by dilution of the hydrotropic solvent with water until a phase separation takes place and separation of the resulting phase to give the pure oxygenated compound which can then be subjected to drying. The compounds which are rendered more volatile can be recovered by removal as a vapor stream followed by condensation and separation of the organic and aqueous phases which are so produced.

In using these solubilizing solutions for extractive distillation separation of oxygenated organic compounds, a variety of methods may be employed for contacting the oxygenated compounds with the aqueous solution of the organic solubilizer. For the more specific separations, as in the separation of closely-boiling oxygenated mixtures boiling within a range of not more than 50° on the centigrade scale, vapor-liquid processes are much to be preferred. This method commonly takes the form of an extractive distillation, using the aqueous solubilizer solution as the extracting solvent. One modification of the method may be carried out by using a fractionating or rectifying column, down which the aqueous mixture containing the hydrotropic agent is passed. The mixture of oxygenated organic compounds employed as the feed, containing the closely-boiling oxygenated components to be separated, is put into the column at an intermediate position.

The fractionating or rectifying tower used for carrying out the extractive distillation procedure should be supplied with suitable plates, packing, or other devices for efficient counter-current contact of liquid and vapor, and should contain a substantial number of plates below the point of introduction of the feed in order to give a substantial stripping zone. The tower should also contain a number of plates between the feed and solvent entrance lines in order to act as a rectification zone. A third zone may also be provided in the column above the solvent supply line in order to furnish a water rectification section, although this is not absolutely necessary for separation of the oxygenated mixture.

Vapor-liquid extraction methods employing these hydrotropic organic agents may be carried out at atmospheric, superatmospheric, and subatmospheric pressures. The use of superatmospheric pressures is advantageous in some cases in that it allows higher temperatures to be used to give higher solubilities of the hydrotropic salts and consequently higher solubilities of the oxygenated organic compounds in the solubilizer solvent are obtained. Subatmospheric pressures obviously would permit lower operating temperatures and usually provide better separations because of the resultant wider spreads in volatilities. However, the decreased capacity of the aqueous phase for dissolving the organic oxygenated mixtures may be a decided disadvantage, since it is desirable to have as high a concentration of oxygenated organic compounds as possible. Extractive distillation methods employing this improved process may be carried out at various temperatures ranging from below about 70° C. up to about 150° C.

A critical factor for successful operation of the process is that there must be maintained a single liquid phase system within the fractionation zone. Thus the concentration of aqueous solvent present is directly influenced by the solubility limitations of the oxygenated organic components in the particular solubilizer solution being used, or, as it is called, the solvent, since it is essential to stay below the concentration at which two phases, an organic phase containing the oxygenated compounds, and an aqueous solvent phase, would be formed. Obviously this offers no problem in cases where the oxygenated organic compounds are themselves substantially water-soluble. For efficient, economical operation in separating water-immiscible compounds, it is desirable to have as high a concentration of organic compounds in the aqueous solvent as possible and still obtain good separation. It is always necessary to stay within the one liquid phase region, however. In most cases, it is considered that a maximum value would be 50% oxygenated organic compounds by weight concentration, exclusive of solubilizers, in the aqueous phase. Table I below shows the experimentally determined solubilities of various oxygenated organic compounds in water and the much enhanced solubilities of the same compounds in 40% aqueous sodium xylene sulfonate solution.

TABLE I

*Solubility of oxygenated organic compounds in water and in aqueous 40% Na xylene sulfonate solution at 25° C.*[1]

| Compound | Solubility | |
|---|---|---|
| | ml./100 ml. H$_2$O | 40% Aqueous Na Xylene Sulfonate |
| Acetophenone | 0.54 | 29.6 |
| Acetyl acetone | 20.6 | >400 |
| Amyl alcohol | 3.4 | >400 |
| i-Amyl alcohol | 3.5 | >400 |
| o-Anisidine | 1.28 | 28.0 |
| Anisole | 1.05 | 4.0 |
| Benzaldehyde | 0.40 | 24.2 |
| n-Butanol | 9.1 | >400 |
| i-Butanol | 11.1 | >400 |
| Diethyl ketone | 5.5 | 25.4 |
| Diethyl ether | 8.0 | 15.8 |
| Ethyl acetate | 8.8 | 42.6 |
| Furfural | 7.9 | >400 |
| alpha Naphthol | <0.05 | 6.0 |
| beta Naphthol | <0.05 | 7.7 |

[1] "Hydrotropic Solubilities"—Booth and Everson, Ind. Eng. Chem. 40, 1491 (1948).

The table shows that by the use of these salt solutions, it is possible to obtain high concentrations of the oxygenated organic compounds in the aqueous extractive solvent phase. Thus, the capacity of the distillation equipment for a given separation can be appreciably increased.

Many different types of mixtures may be separated by the selective solvents employed in this invention. All that is necessary is that the presence of the aqueous solubilizer solution causes a greater change in the "escaping tendency" of at least one component of the mixture relative to that of one or more others in the mixture. By "escaping tendency" is meant the potential of a component to pass from one phase to another, as in this case from the liquid to the vapor phase. Stated another way, the relative volatilities of the closely-boiling components are so altered by the presence of a solubilizer solution that an efficient separation can be made.

It is best to use a mixture of oxygenated organic compounds having no more than 100° spread in boiling range on the centigrade scale and, in most cases, a range of not more than 50° on the centigrade scale is satisfactory. Ranges of not more than 20° on the centigrade scale have been found to give the best results. Where the mixture of oxygenated organic compounds has a very wide boiling range, it is best to carry out the separation by other well-known methods or a combination of these with the present process.

The separation method may be used to separate mixtures of oxygenated organic compounds of one class from those in another class. For the purpose of discussing such class-type separations, organic compounds may be divided into the usual classes of organic chemistry, including alcohols, ethers, esters, ketones, acetals, aldehydes, etc. Although it is not desired to suggest that any particular theoretical principle is primarily responsible for the good results obtained, it is believed that the altered volatility effects which are obtained between classes of oxygenated organic compounds may be at least partially due to two different actions exercised by the presence of the organic hydrotropic solubilizer. For example, the presence of the solubilizing material may permit the more effective use of the water extractive distillation principally due to the solubilizing effect in systems that are not normally water-miscible. As a second and perhaps more important effect, the action of the salt may be a preferential solubilization of one component of a mixture in relation to the other components as considered in relation to the structure of the salt with that of the preferentially solubilized compound. Furthermore, the relative polarizability of the components being separated may be a factor in determining the solubility of any particular component in any one solubilizing solvent. Thus, classes of compounds which are more easily polarizable or distortable may, in general, be expected to be relatively more soluble in the solvent and relatively less volatile in the presence of the solvent, than will be an oxygenated component from a class which is less easily polarizable. For instance, it has been found possible to separate alcohols from ethers by this process. Specific examples include the separation of phenyl methyl ether (anisole) from n-hexanol in the presence of an aqueous solution of sodium p-cymene sulfonate in which the relative volatility of anisole to n-hexanol was increased from 1.14 to 4.56–6.30. As an example of another typical class separation, that of an alcohol from a heterocyclic oxygenated compound, it was found that secondary butanol and dioxane when subjected to extractive distillation in the presence of an aqueous solution of sodium butyrate, showed relative volatility of secondary butanol to dioxane increased from 1.06 to 1.39–1.71. Other typical types of class separations include the separation of alcohols from esters, separation of ethers from esters, separation of alcohols from aldehydes, and the separation of alcohols from ketones. It should be understood that the greatest advantage for the separation process is obtained in cases where the oxygenated components being separated are similar in molecular weight and have close boiling points. A number of other types of class separations may also be accomplished by this method. These includes ketone-acid separations, for example, methyl n-amyl ketone-propionic acid, aldehyde-ester separations, for instance, 2-ethyl hexaldehyde from n-butyl butyrate, and aromatic-non-aromatic separations, as, for instance, phenol from cyclohexanol.

It is also possible to effect very specific separations in which oxygenated compounds within a given broad chemical class may be separated from each other by this method, whereas other separation methods completely fail. This is perhaps one of the most important applications of the invention. For example, one type of separation of current interest is the separation of cyclic and straight chain alcohol compounds from each other where the molecular weights of the two components are very close. Typical examples are the separation of n-hexanol from cyclohexanol and the separation of n-heptanol from metamethyl cyclohexanol. Mixtures containing these components are currently produced in such synthesis reactions as oxonation reactions in which olefins as obtained from the catalytic cracking of petroleum products are utilized. In actual experiments, it was found that when a mixture of n-hexanol and cyclohexanol was subjected to extractive distillation in the presence of a 35 weight per cent concentration of sodium xylene sulfonate, the relative volatility of n-hexanol to cyclohexanol was enhanced from 1.14 to 2.05–2.30. Furthermore, when a mixture of n-heptanol and metamethyl cyclohexanol was subjected to extractive distillation in the presence of aqueous sodium p-cymene sulfonate of 38 weight per cent concentration, the relative volatility of n-heptanol to metamethyl cyclohexanol was enhanced from 0.92 to 1.08–1.20. A third type of separation which can be accomplished by this method is the separation of isomeric compounds as, for example, branched chain structures from straight chain structures. Here again, separations may be accomplished within a particular single chemical class. For example, when a mixture of diethyl ketone and methyl-n-propyl ketone was subjected to extractive distillation in the presence of a 36 weight per cent aqueous solution of sodium p-cymene sulfonate, the relative volatility of the symmetrical diethyl ketone to the unsymmetrical methyl-n-propyl ketone was increased from 1.00 to 1.08–1.40.

A fourth type of separation which can be carried out by this method is that of separation of oxygenated compounds of the same chemical class but having slightly different molecular weights. For example, the relative volatility of isopropanol to ethanol can be altered from the calculated value of 0.86 to an enhanced value of 1.31–1.53 in the presence of an aqueous solution of sodium xylene sulfonate.

In Table II below there is summarized the effect of various hydrotropic salt solutions on calculated relative volatilities using various mixtures of feed.

TABLE II

Effect of aqueous hydrotropic salt solutions on relative volatility

| Compound | | Relative Volatility of A to B | | Salt | Salt Conc. (Wt. Percent) |
| --- | --- | --- | --- | --- | --- |
| A | B | Normal | Found | | |
| Isopropanol | Ethanol | 0.86 | 1.31–1.36 | Mixed Na | 46 |
| | | 0.86 | 1.52–1.53 | Xylene sulfonate | 20 |
| n-Hexanol | Cyclohexanol | 1.14 | 2.05–2.30 | Mixed Na Xylene sulfonate | 35 |
| Diethyl Ketone | Me-n-Propyl Ketone | 1.00 | 1.08–1.40 | Na p-Cymene sulfonate | 36 |
| sec-Butanol | Dioxane | 1.06 | 1.39–1.71 | Na butyrate | 30 |
| Anisole | n-Hexanol | 1.14 | 4.56–6.30 | Na p-Cymene sulfonate | 55 |

The rule for predicting which oxygenated compound of a mixture will be rendered more volatile seems to be that the less soluble compound has its volatility enhanced in relation to that of the more soluble compound. Furthermore, solubility in these solvents appears to be directly proportional to the polarity of the solute compound and inversely proportional to the molecular weight of the boiling point. Thus it has been noted that in certain cases the actual solubility properties of the solubilizer solution for the specific oxygenated compounds have a more or less definite relationship to their relative volatilities, and while it would seem from various data obtained that the effects on the normal relative volatilities are more or less in line with the solubility of the oxygenated organic compounds in any particular aqueous solubilizer solution, there is not, however, to be assumed a perfect correlation.

It is considered within the scope of the invention to use mixtures of especially adapted solubilizers in order to effect either complete removal or enrichment of a single oxygenated compound or a class of oxygenated compounds from a complex mixture containing a variety of such compounds. As a general rule, when very selective separations are being attempted, it has been found best to use as a solubilizer compound a homogeneous chemical entity, that is, an agent having one particular carbon skeleton rather than a mixture of such agents. However, when a less specific separation is required as, for example, in general class separations, it is usually not necessary to use pure solubilizers, as mixtures of the appropriate compounds quite generally give satisfactory selectivity.

It should be noted that this method of using these organic solubilizers in extractive distillation processes to effect a separation of closely-boiling oxygenated compounds is not limited to separations which yield the components in a final purified form. This method may also be used along with well-known methods such as adsorption, fractional distillation, and crystallization. In fact, in certain cases, this method may be a very valuable tool when used in conjunction with other methods.

The invention will be more clearly understood by reference to the following specific examples. These specific cases are illustrative only and are not intended to so limit the scope of the invention.

EXAMPLE I

This example will be more fully understood by reference to the diagram in the accompanying figure read in conjunction with the following continuous extractive distillation process. A mixture consisting of n-hexanol (B. P. 156.4° C.) and cyclohexanol (B. P. 161.5° C.) is fed to fractionating bell cap tower 2 at an intermediate inlet point 1. An approximately 35 weight per cent water solution of mixed sodium xylene sulfonate is introduced into the column by means of inlet line 15. A reboiler 3 with suitable heating means is used to provide continuous reflux with fractionating tower 2. In the presence of the mixed sodium xylene sulfonate solubilizer, the alpha value, which can be defined as the ratio of volatility of n-hexanol to cyclohexanol, was increased from a normal value of 1.14 to 2.30. Because of this increased volatility, an aqueous n-hexanol-enriched vapor stream can be removed from the top of the column after passing through a rectification zone (a) through outlet line 6. The n-hexanol-enriched vapor is subsequently condensed in condenser 7. The liquid condensate is sent by line 16 from condenser 7 to a continuous decanter 17 in which there is formed an upper organic layer consisting of the n-hexanol-enriched alcohol phase and a lower aqueous phase consisting predominantly of water. The vapor stream obtained through outlet line 6 when analyzed is shown to consist of 95.7 mole per cent water, the remainder being alcohols.

The upper organic phase is removed from phase separator or decanter 17 by line 18 and at least a part is returned as reflux to fractionating tower 2 by lines 20 and 15. A part may be removed as an n-hexanol-enriched fraction by line 19. The lower aqueous layer is removed from phase separator 17 by line 21. All or a part of this aqueous phase is returned to tower 2 by lines 23 and 15 as reflux. If desired, a part may be removed by line 22 in order to control more accurately the salt concentration present within fractionating tower 2. From the bottom of tower 2, there is removed through line 4 the aqueous mixed sodium xylene sulfonate solvent enriched in cyclohexanol. At least a part of this mixture can be recycled back to the column through inlet line 5 for heating purposes after passing through reboiler 3. Liquid samples from the lower portion of the column when analyzed, showed 93.7 mole per cent water, 4.6 mole per cent salt, and 1.7 mole per cent mixed alcohols enriched in cyclohexanol. A part of the mixture removed at outlet line 4 is introduced at an intermediate point 10 into stripper fractionating tower 11. This tower 11 is provided with suitable heating means 12 to maintain temperatures sufficient to result in substantially complete stripping of the alcohols from the aqueous solubilizer solution. An aqueous fraction enriched in cyclohexanol is removed from the upper portion of the column by line 13, liquefied by condenser 14, and sent by line 24 to a continuous phase separator or decanter 31. The upper organic phase, consisting of a mixture of alcohols enriched in cyclohexanol, is removed by line 25 and a part may be recycled by line 27 back to fractionating tower 11 as reflux, while a portion is removed by line 26 as a cyclohexanol-enriched fraction. From the lower portion of the continuous decanter or phase separator 31, there is removed an aqueous fraction by line 28, a major portion or all of which may be recycled back to fractionating tower 11 by lines 30 and 27. If desired, a part can be removed by line 29. The lean aqueous solution is taken from the bottom outlet 8 of the stripper tower 11 and, if desired, all or part can be recycled through lines 9 and 15 back to fractionating tower 2. The conditions of operation of fractionating tower 2, which consists of an upper portion (a) which acts as a rectification zone and a lower portion (b) which acts as a stripping zone, are essentially such that the equilibrium vapor temperature is approximately 98° C. and the equilibrium liquid temperature is approximately 100° C. under a barometric pressure of 768 mm. Hg.

EXAMPLE II

In a similar type operation carried out in a flow equilibrium still, a number of runs were studied in which varying mixtures of n-hexanol and cyclohexanol were employed as feed and a 35 weight per cent aqueous mixed sodium xylene sulfonate solution was employed as a solvent. The data obtained in these runs are shown in Table III below. The normal relative volatility of n-hexanol to cyclohexanol was enhanced from 1.14 to 2.05–2.19 in these runs.

TABLE III

Relative volatility of n-hexanol to cyclohexanol in the presence of aqueous mixed sodium xylene sulfonates (35 weight per cent conc.)

| Run No. | 1 | 2 | 3 |
| --- | --- | --- | --- |
| Vapor Sample: | | | |
| Mole percent n-hexanol, Binary basis | 59.5 | 62.4 | 79.1 |
| Mole percent cyclohexanol, Binary basis | 40.5 | 37.6 | 20.9 |
| Mole percent H$_2$O | 95.5 | 95.9 | 95.7 |
| Liquid Sample: | | | |
| Mole percent n-hexanol, Binary basis | 40.1 | 44.5 | 64.9 |
| Mole percent cyclohexanol, Binary basis | 59.9 | 55.5 | 35.1 |
| Mole percent H$_2$O | 93.9 | 93.9 | 93.7 |
| Mole percent NaXS | 4.6 | 4.7 | 4.9 |
| Equilibrium Vapor temp., ° C | 98.0 | 98.0 | 97.5 |
| Equilibrium liquid temp., ° C | 100.1 | 100.2 | 100.0 |
| Barometric Press., mm. Hg | 768 | 768 | 757 |
| Relative volatility of n-hexanol to cyclohexanol ($\alpha$) | 2.19 | 2.07 | 2.05 |
| Normal Relative Volatility ($\alpha$) | 1.14 | 1.14 | 1.14 |

EXAMPLE III

A similar type study was made of the change in relative volatility of n-hexanol to cyclohexanol when a mixture of these compounds was used as feed to a flow equilibrium still using a 37 weight per cent concentration of an aqueous sodium butyrate solution as a solvent. These data are summarized in Table IV. The relative volatility of n-hexanol to cyclohexanol was enhanced from 1.14 to 1.88–1.98 under these conditions.

TABLE IV

*Relative volatility of n-hexanol to cyclohexanol in the presence of aqueous sodium butyrate (35 weight per cent conc.)*

| Run No | 4 | 5 | 6 |
|---|---|---|---|
| Vapor Sample: | | | |
| Mole percent n-hexanol, Binary basis | 78.2 | 63.2 | 44.8 |
| Mole percent cyclohexanol, Binary basis | 21.8 | 36.8 | 55.2 |
| Mole percent $H_2O$ | 93.9 | 95.4 | 95.2 |
| Liquid Sample: | | | |
| Mole percent n-hexanol, Binary basis | 65.6 | 47.6 | 29.1 |
| Mole percent cyclohexanol, Binary basis | 34.4 | 52.4 | 70.9 |
| Mole percent $H_2O$ | 89.9 | 89.8 | 90.0 |
| Mole percent Na Butyrate | 9.2 | 9.4 | 9.0 |
| Equilibrium Vapor temp., °C | 98.0 | 97.9 | 98.1 |
| Equilibrium liquid temp., °C | 104.1 | 104.1 | 104.1 |
| Barometric Press., mm. Hg | 767 | 767 | 767 |
| Relative volatility of n-hexanol to cyclohexanol ($\alpha$) | 1.88 | 1.89 | 1.98 |
| Normal Relative Volatility ($\alpha$) | 1.14 | 1.14 | 1.14 |

EXAMPLE IV

In a study made on the relative volatility of n-heptanol to metamethyl cyclohexanol in the presence of aqueous sodium p-cymene sulfonate solution as a solvent, the data obtained by the use of a flow equilibrium still indicated an increase in the normal relative volatility of from 0.92 to 1.08–1.20. These data are summarized in runs 7, 8, and 9 shown in Table V.

TABLE V

*Relative volatility of n-heptanol to m-methyl cyclohexanol in the presence of aqueous sodium p-cymene sulfonate (38 weight per cent conc.)*

| Run No | 7 | 8 | 9 |
|---|---|---|---|
| Vapor Sample: | | | |
| Mole percent n-heptanol, Binary basis | 66.0 | 52.3 | 30.7 |
| Mole percent m-Me-cyclohexanol, Binary basis | 34.0 | 47.7 | 69.3 |
| Mole percent $H_2O$ | 98.2 | 98.6 | 98.6 |
| Liquid Sample: | | | |
| Mole percent n-heptanol, Binary basis | 64.3 | 47.7 | 27.4 |
| Mole percent m-Me-cyclohexanol, Binary basis | 35.7 | 52.3 | 72.6 |
| Mole percent $H_2O$ | 94.7 | 94.1 | 93.9 |
| Mole percent Na-p-cymene sulfonate | 4.3 | 4.8 | 5.0 |
| Equilibrium Vapor temp., °C | 98.5 | 98.6 | 98.7 |
| Equilibrium liquid temp., °C | 100.2 | 100.3 | 100.4 |
| Barometric Press., mm. Hg | 753 | 753 | 754 |
| Relative volatility of n-heptanol to m-methyl cyclohexanol ($\alpha$) | 1.08 | 1.20 | 1.18 |
| Normal Relative Volatility ($\alpha$) | 0.92 | 0.92 | 0.92 |

EXAMPLE V

As an example of a typical class separation, in this case the separation of an ether from an alcohol, data have been obtained using a mixture of anisole-n-hexanol as feed to a flow equilibrium still and using a 55 weight percent concentration of aqueous sodium p-cymene sulfonate as the solvent. These data are shown below as runs 10, 11, and 12 in Table VI and indicate that under these conditions, the relative volatility of anisole to n-hexanol was increased from 1.14 to 4.56–6.30.

TABLE VI

*Relative volatility of phenyl methyl ether (anisole) to n-hexanol in the presence of aqueous sodium p-cymene sulfonate (55 weight percent conc.)*

| Run No | 10 | 11 | 12 |
|---|---|---|---|
| Vapor Sample: | | | |
| Mole percent Anisole, Binary basis | 78.9 | 72.1 | 66.9 |
| Mole percent n-hexanol, Binary basis | 21.1 | 27.9 | 33.1 |
| Mole percent $H_2O$ | 94.5 | 93.3 | 94.4 |
| Liquid Sample: | | | |
| Mole percent Anisole, Binary basis | 45.0 | 33.9 | 24.3 |
| Mole percent n-hexanol, Binary basis | 55.0 | 66.1 | 75.7 |
| Mole percent $H_2O$ | 89.3 | 89.1 | 89.1 |
| Mole percent NaPCS | 9.3 | 9.1 | 9.2 |
| Equilibrium Vapor temp., °C | 97.0 | 96.7 | 96.9 |
| Equilibrium liquid temp., °C | 101.0 | 100.8 | 101.0 |
| Barometric Press., mm. Hg | 766 | 766 | 766 |
| Relative volatility of Anisole to n-hexanol ($\alpha$) | 4.56 | 5.04 | 6.30 |
| Normal Relative Volatility ($\alpha$) | 1.14 | 1.14 | 1.14 |

EXAMPLE VI

In a series of runs 13, 14 and 15 to study the effect of 30 weight per cent concentration of aqueous sodium butyrate as a solvent on a mixed feed containing secondary butanol and dioxane, it was discovered that the normal relative volatility of secondary butanol to dioxane, which was calculated to be 1.06, was increased to 1.39–1.71. Conditions and results of these experiments are shown in Table VII.

TABLE VII

*Relative volatility of secondary butanol to dioxane in the presence of aqueous sodium butyrate (30 weight per cent conc.)*

| Run No | 13 | 14 | 15 |
|---|---|---|---|
| Vapor Sample: | | | |
| Mole percent sec.-BuOH, Binary basis | 74.2 | 57.5 | 36.7 |
| Mole percent Dioxane, Binary basis | 25.8 | 42.5 | 63.3 |
| Mole percent $H_2O$ | 57.6 | 57.9 | 59.7 |
| Liquid Sample: | | | |
| Mole percent sec.-BuOH, Binary basis | 67.4 | 45.5 | 25.3 |
| Mole percent Dioxane, Binary basis | 32.6 | 54.5 | 74.7 |
| Mole percent $H_2O$ | 88.8 | 89.0 | 89.1 |
| Mole percent Sodium butyrate | 6.5 | 6.5 | 6.5 |
| Equilibrium Liquid Temp., °C | 90.8 | 91.5 | 92.5 |
| Barometric Press., mm. Hg | 762.5 | 762.2 | 761.3 |
| Relative volatility of sec.-BuOH to Dioxane ($\alpha$) | 1.39 | 1.62 | 1.71 |
| Normal Relative Volatility ($\alpha$) | 1.06 | 1.06 | 1.06 |

EXAMPLE VII

In order to study the relative volatility change produced in separating a mixture of isomers, a study was made using a mixture of diethyl ketone and methyl n-propyl ketone and using 36 weight per cent concentration of an aqueous sodium p-cymene sulfonate as solvent. Runs 16, 17, and 18, shown in Table VIII below, indicate that the normal relative volatility of diethyl ketone to methyl n-propyl ketone was increased under the conditions indicated from 1.00 to 1.08–1.40.

TABLE VIII

*Relative volatility of diethyl ketone to methyl n-propyl ketone in the presence of aqueous sodium p-cymene sulfonate (36 weight percent conc.)*

| Run No | 16 | 17 | 18 |
|---|---|---|---|
| Vapor sample: | | | |
| Mole percent DEK, Binary basis | 23.0 | 44.6 | 63.6 |
| Mole percent MnPK, Binary basis | 77.0 | 55.4 | 36.4 |
| Mole percent $H_2O$ | 68 | 68 | 67 |
| Liquid Sample: | | | |
| Mole percent DEK, Binary basis | 17.6 | 40.0 | 62.5 |
| Mole percent MnPK, Binary basis | 82.4 | 60.0 | 37.5 |
| Mole percent $H_2O$ | 93.2 | 94.7 | 93.3 |
| Mole percent NapCS | 4.5 | 4.4 | 4.6 |
| Equilibrium Vapor temp., °C | 88.5 | 88.5 | 88.0 |
| Equilibrium liquid temp., °C | 90.5 | 90.0 | 89.5 |
| Barometric Press., mm. Hg | 765 | 765 | 765 |
| Relative Volatility of Diethyl Ketone to Methyl n-Propyl Ketone ($\alpha$) | 1.40 | 1.21 | 1.08 |
| Normal Relative Volatility ($\alpha$) | 1.00 | 1.00 | 1.00 |

EXAMPLE VIII

In a series of studies conducted on a mixture of isopropanol and ethanol in the presence of varying concentrations of aqueous mixed sodium xylene sulfonate solutions, it was determined that the relative volatility is isopropanol to ethanol which has a normal value of 0.86 was enhanced to values of from 1.31 to 1.53, the exact amount of enhancement depending upon the exact concentration of mixed sodium xylene sulfonate present in the solvent. These data and the conditions under which they were obtained are shown below in Table IX.

TABLE IX

*Relative volatility of isopropanol to ethanol in the presence of aqueous mixed sodium xylene sulfonates*

| Run No | 19 | 20 | 21 | 22 | 23 | 24 |
|---|---|---|---|---|---|---|
| Vapor Sample: | | | | | | |
| Mole percent IPrOH, Binary basis | 34.5 | 55.7 | 74.8 | 37.1 | 58.4 | 76.6 |
| Mole percent EtOH, Binary basis | 65.5 | 44.3 | 25.2 | 62.9 | 41.6 | 23.4 |
| Mole percent H$_2$O | 55.5 | 56.1 | 56.4 | 56.7 | 59.6 | 59.2 |
| Salt conc., wt. percent | 46 | 46 | 46 | 20 | 20 | 20 |
| Liquid Sample: | | | | | | |
| Mole percent IPrOH, Binary basis | 28.7 | 48.5 | 68.6 | 27.9 | 47.8 | 68.1 |
| Mole percent EtOH, Binary basis | 71.3 | 51.5 | 31.4 | 72.1 | 52.2 | 31.9 |
| Mole percent H$_2$O | 85.4 | 85.7 | 86.2 | 90.8 | 92.3 | 92.7 |
| Mole percent NaXS | 6.6 | 6.6 | 6.6 | 2.0 | 2.0 | 2.1 |
| Equilibrium Liquid Temp, °C | 90.2 | 90.0 | 90.0 | 88.7 | 89.2 | 89.0 |
| Barometric Press., mm. Hg | 765.6 | 770.2 | 765.4 | 770.7 | 762.3 | 762.5 |
| Relative Volatility of IPrOH to EtOH ($\alpha$) | 1.31 | 1.34 | 1.36 | 1.52 | 1.53 | 1.53 |
| Normal Relative Volatility ($\alpha$) | 0.86 | 0.86 | 0.86 | 0.86 | 0.86 | 0.86 |

What is claimed is:

1. A process for the separation of close-boiling oxygenated compounds which comprises subjecting a mixture of water-immiscible organic oxygenated compounds having water solubilities less than about 10 ml. per 100 ml. H$_2$O and having a boiling range of not more than 50° on the centigrade scale to extractive distillation using as an extraction solvent an aqueous mixture containing in solution not less than 20% by weight of at least one hydrotropic organic solubilizer consisting essentially of a salt of an organic compound containing at least one cyclic nucleus having at least one water solubilizing group, whereby the relative volatilities of the oxygenated compounds of the mixture are altered and the compounds which are rendered relatively more volatile are separated from the compounds which are rendered relatively less volatile.

2. A process for the separation of close-boiling oxygenated organic compounds which comprises subjecting a mixture of oxygenated compounds containing both cyclic and acyclic alcohols having approximately the same molecular weights and having a normal boiling point difference of no more than about 5° C., to an extractive distillation using as the extraction solvent an aqueous mixture containing in solution at least 35% by weight of a hydrotropic organic solubilizer consisting essentially of a salt of an organic compound containing at least one cyclic nucleus having at least one water solubilizing group, whereby the acyclic alcoholic components of the mixture are rendered relatively more volatile and the cyclic alcoholic components of the mixture become relatively less volatile and the components which are rendered relatively more volatile are separated from the components rendered relatively less volatile by vaporization.

3. A process for the separation of close-boiling alcohols which comprises subjecting an alcoholic mixture having a boiling range of not more than 50° on the centigrade scale and containing both cyclic and acyclic alcohols to an extractive distillation using as the extraction solvent an aqueous solution of a water-soluble salt of an organic acid, whereby the acyclic alcoholic components are rendered relatively more volatile and the cyclic alcoholic components become relatively less volatile and the components which are rendered relatively more volatile are separated from the components which are rendered relatively less volatile by vaporization.

4. A process according to claim 3 in which the salt of the organic acid is a mixture of sodium xylene sulfonates and the close-boiling alcohol mixture consists essentially of n-hexanol and cyclohexanol.

5. A process according to claim 3 in which the salt of the organic acid is sodium p-cymene sulfonate and the close-boiling alcohol mixture consists essentially of n-heptanol and m-methylcyclohexanol.

6. A process for the separation of close-boiling water-immiscible oxygenated organic compounds having water solubility less than about 10 ml. per 100 ml. H$_2$O which comprises subjecting a mixture of oxygenated compounds having a normal boiling point difference of no more than about 5° C. and containing at least one ether and one alcohol to an extractive distillation using as the extraction solvent an aqueous mixture containing in solution at least 35% by weight of a hydrotropic organic solubilizer consisting essentially of a salt of an organic compound containing at least one cyclic nucleus having at least one water solubilizing group, whereby the ether components of the mixture are rendered relatively more volatile and the alcohol components become relatively less volatile and those components which are rendered relatively more volatile are separated from those components which are rendered relatively less volatile.

7. A process for the separation of a mixture of close boiling water immiscible oxygenated organic compounds consisting essentially of anisole and n-hexanol which comprises subjecting said mixture to an extractive distillation, using as the extraction solvent an aqueous mixture containing in solution at least 35% by wt. of sodium p-cymene sulfonate, whereby the ether component of the mixture is rendered more volatile and the alcohol component becomes relatively less volatile and the component which is rendered relatively more volatile is separated from the component which is rendered relatively less volatile.

8. A process for the separation of close-boiling water-immiscible oxygenated organic mixtures including compounds having water solubility less than about 10 ml. per 100 ml. H$_2$O, which comprises subjecting a mixture of oxygenated organic compounds containing at least two oxygenated compounds showing structural isomerism and selected from the same chemical class and having a normal boiling point difference of no more than about 5° C., to an extractive distillation using as an extraction solvent an aqueous mixture containing in solution at least 35% by weight of a hydrotropic organic solubilizer consisting essentially of a salt of an organic compound containing at least one cyclic nucleus having at least one water solubilizing group, whereby the relative volatility of the isomeric components of the oxygenated mixture is altered and the components which are rendered relatively more volatile are separated from the components which are rendered relatively less volatile.

9. A process for the separation of close boiling oxygenated organic mixtures comprising diethyl ketone and methyl n-propyl ketone which comprises subjecting said mixture to an extractive distillation using as an extraction solvent an aqueous mixture containing in solution at least 35% by wt. of sodium p-cymene sulfonate, whereby the relative volatility of the isomeric components of the oxygenated mixture is altered and the component rendered relatively more volatile is separated from the component relatively less volatile.

10. A process for the separation of close-boiling, oxygenated organic compounds which comprises subjecting a mixture of water-immiscible oxygenated compounds containing both cyclic and acyclic alcohols having approximately the same molecular weights and having a normal boiling point difference of no more than about 50° C., to an extractive distillation using as the extraction solvent an aqueous mixture of a hydrotropic organic solubilizer consisting essentially of a salt of an organic compound containing at least one cyclic nucleus having at least one water solubilizing group, whereby the acyclic alcoholic components of the mixture are rendered relatively more volatile and the cyclic alcoholic components of the mixture become relatively less volatile and the components which are rendered relatively more volatile are separated from the components rendered relatively less volatile by vaporization.

References Cited in the file of this patent

UNITED STATES PATENTS

| | | |
|---|---|---|
| 996,328 | Guillaume | June 27, 1911 |
| 2,198,651 | Bludworth | Apr. 30, 1940 |
| 2,273,923 | Bludworth | Feb. 24, 1942 |
| 2,290,442 | Metzl | July 21, 1942 |
| 2,321,748 | Hopkins | June 15, 1943 |
| 2,455,803 | Pierotti | Dec. 7, 1948 |
| 2,514,966 | Pierotti | July 11, 1950 |
| 2,551,584 | Carlson et al. | May 8, 1951 |

(Other references on following page)

UNITED STATES PATENTS

| | | |
|---|---|---|
| 2,551,593 | Gilliland et al. | May 8, 1951 |
| 2,551,625 | Morrell et al. | May 8, 1951 |
| 2,551,626 | Morrell et al. | May 8, 1951 |
| 2,567,228 | Morrell et al. | May 8, 1951 |
| 2,588,056 | Teter et al. | Mar. 4, 1952 |
| 2,588,272 | Morrell et al. | Mar. 4, 1952 |
| 2,612,468 | Morrell et al. | Sept. 30, 1952 |

FOREIGN PATENTS

| | | |
|---|---|---|
| 563,164 | Great Britain | Aug. 1, 1944 |

OTHER REFERENCES

Booth et al. "Hydrotropic Solubilities," Industrial & Engineering Chemistry, Vol. 40.